(12) United States Patent
Innocenti et al.

(10) Patent No.: US 7,504,171 B2
(45) Date of Patent: Mar. 17, 2009

(54) SYSTEM FOR FEEDING GASEOUS FUEL, IN PARTICULAR HYDROGEN, FOR FUEL CELLS

(75) Inventors: Gianfranco Innocenti, Rivalta (IT); Mauro Sgroi, San Secondo di Pinerolo (IT); Gianluca Bollito, Turin (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 439 days.

(21) Appl. No.: 11/365,809

(22) Filed: Mar. 2, 2006

(65) Prior Publication Data

US 2006/0199066 A1    Sep. 7, 2006

(30) Foreign Application Priority Data

Mar. 7, 2005    (EP) .................... 05425127

(51) Int. Cl.
*H01M 8/06* (2006.01)
*F17C 11/00* (2006.01)

(52) U.S. Cl. .......................... 429/26; 206/0.7
(58) Field of Classification Search .......... 96/108, 96/146; 420/900; 206/0.7; 423/248, 648.1; 429/26, 34, 218.2
See application file for complete search history.

(56) References Cited

U.S. PATENT DOCUMENTS

| 4,826,741 | A | 5/1989 | Aldhart et al. |
|---|---|---|---|
| 5,932,365 | A | 8/1999 | Lin et al. |
| 6,406,808 | B1 | 6/2002 | Pratt et al. |
| 6,468,681 | B1 * | 10/2002 | Horiguchi ................ 429/26 |
| 2002/0045079 | A1 | 4/2002 | Shimada |
| 2003/0022031 | A1 | 1/2003 | Manery |
| 2003/0049501 | A1 * | 3/2003 | Fujita ..................... 429/20 |
| 2003/0232229 | A1 * | 12/2003 | Bergqvist ................ 429/26 |
| 2004/0247959 | A1 * | 12/2004 | Kimbara et al. ........... 429/20 |
| 2005/0139493 | A1 * | 6/2005 | Myasnikov et al. ........ 206/0.7 |

FOREIGN PATENT DOCUMENTS

EP    0 917 225    5/1999
EP    1 327 606    7/2003

* cited by examiner

*Primary Examiner*—Frank M Lawrence
(74) *Attorney, Agent, or Firm*—Nixon & Vanderhye P.C.

(57) ABSTRACT

System for feeding gaseous fuel, in particular hydrogen, for fuel cells which comprises a storage tank for the gaseous fuel of the type comprising a case containing a material absorbing the gaseous fuel, in particular a metal hydride, and means for applying an amount of heat to the material absorbing gaseous fuel and determining the flow of the gaseous fuel from the absorbing material towards an anode of one or more fuel cell. The storage tank and the one or more fuel cell are mutually arranged in such a way as to achieve a heat exchange relationship between the anode of one or more fuel cells and the gas absorbing material, the means for applying an amount of heat comprising the heat exchange between the anode of one or more fuel cells and the gas absorbing material.

16 Claims, 5 Drawing Sheets

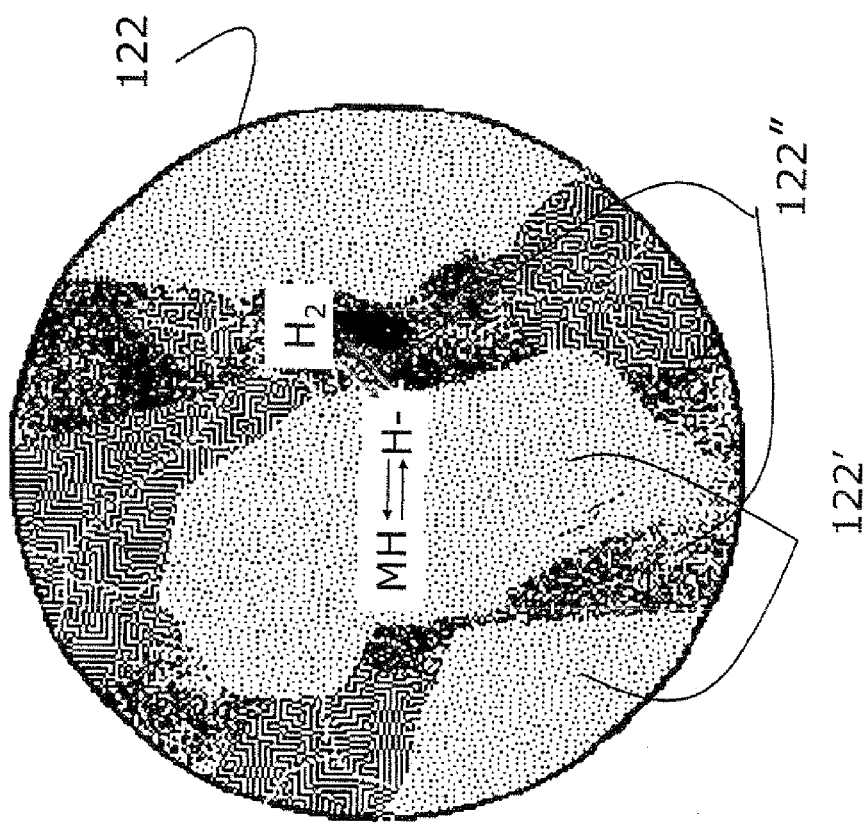
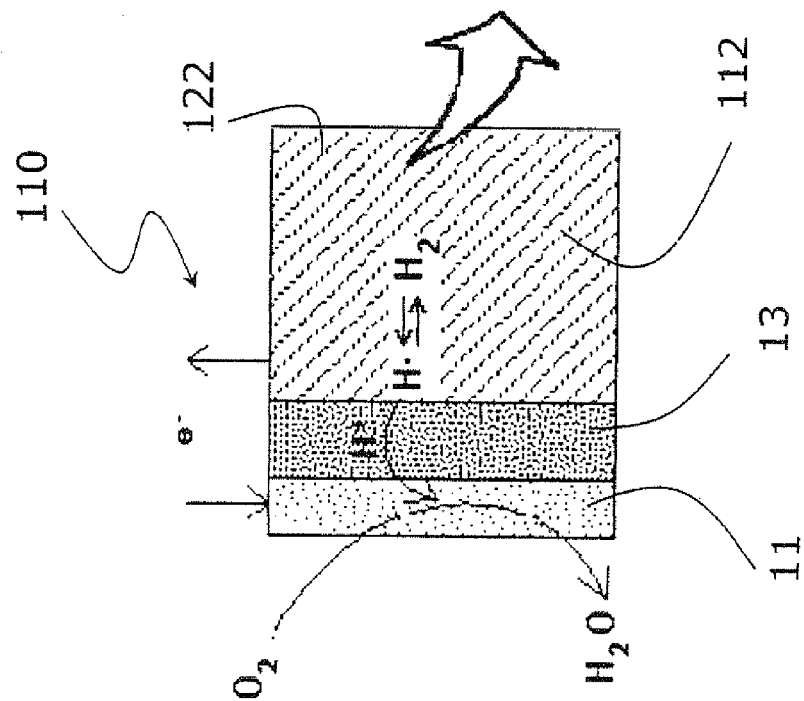
Fig. 3a
Fig. 3b

SYSTEM FOR FEEDING GASEOUS FUEL, IN PARTICULAR HYDROGEN, FOR FUEL CELLS

The present invention relates to a system for feeding gaseous fuel, in particular hydrogen, for fuel cells which comprises a storage tank for said gaseous fuel of the type comprising a case containing a material absorbing said gaseous fuel, in particular a metal hydride, and means for applying an amount of heat to said material absorbing gaseous fuel and determining the flow of said gaseous fuel from said absorbing material towards an anode of a fuel cell.

In the field of hydrogen operated fuel cells, there is the need to store hydrogen in a form that is particularly convenient for use.

With regard to storage in bottles, the volumetric energy content of compressed hydrogen is very low, if compared for example to that of petrol. Even operating at high pressure and accepting the potential risk entailed by operation at high pressures, the disadvantage in terms of volumetric energy content remains marked. The liquefaction of hydrogen allows to obtain the most convenient form to handle for storage, with an appreciable energy content. However, electrical energy expenditure for liquefaction accounts for about 50% of the enthalpy of combustion of hydrogen, so the energy balance appears unfavourable.

To obtain a better volumetric energy content, therefore, the prior art provides for storing the hydrogen to be used to feed the combustion in volumes of metal hydrides, such as magnesium hydride $MgH_2$ or nickel magnesium hydride $Mg_2NiH_4$.

The energy required to confine hydrogen in this state is less than the energy required by the liquefaction process, but the energy required to free hydrogen from the hydride compound is thermal and not electrical. This makes the use of hydride storage tanks in connection with fuel cells difficult because of the need to provide thermal energy to the tank and hence to operate at high temperatures.

The object of the present invention is to provide a solution capable freeing hydrogen in efficient and convenient fashion in a hydride tank for fuel cells.

According to the present invention, said object is achieved thanks to a storage tank for fuel cells having the characteristics specifically set out in the annexed claims.

As will be readily apparent, in the preferred form of the invention the system for feeding gaseous fuel, in particular hydrogen, for fuel cells comprises a storage tank for said gaseous fuel having a case containing a material absorbing said gaseous fuel, in particular a metal hydride, and means for applying an amount of heat to said material absorbing gaseous fuel and determining the flow of said gaseous fuel from said absorbing material towards an anode of one or more fuel cells, characterised in that said storage tank and said one or more fuel cells are mutually arranged in such a way as to achieve a heat exchange relationship between said anode of one or more fuel cells and said gas absorbing material, said means for applying an amount of heat comprising said heat exchange between said anode of one or more fuel cells and said gas absorbing material.

This is obtained in particular inserting a plurality of fuel cells inside the case of the storage tank, in heat exchange with the metal hydride that is in its turn contained in the case.

The invention shall now be described with reference to the accompanying drawings, provided purely by way of non limiting example, in which:

FIGS. 3a and 3b are respectively is a schematic representation and a detail of a second embodiment of the system according to the invention;

FIG. 1 shows a general diagram illustrating a principle relating to the proposed feeding system.

A fuel cell 10 and a hydride hydrogen tank 20 are shown. Said tank 20 feeds hydrogen $H_2$ towards the fuel cell 10. Said fuel cell 10 produces, in known fashion, electrical energy and available excess heat Q which is dissipated to the exterior environment and, according to the invention, to the hydride tank 20.

Thus, the principle underlying the present invention is to recover the heat necessary to the desorption of hydrogen directly by the final user, i.e. plausibly the fuel cell.

Figure 1:
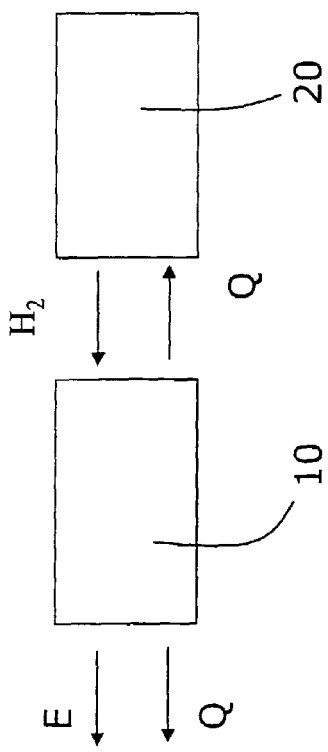
FIG. 1 is a block diagram representing a feeding system for fuel cell according to the invention.
Figure 2:
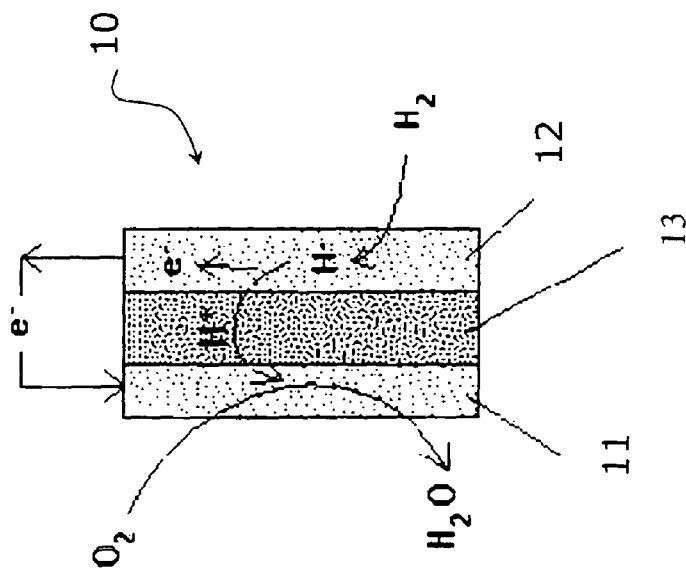
FIG. 2 is a schematic representation of a first embodiment of the system according to the invention.

FIG. 2 shows by reference the fuel cell 10 in greater detail. Said fuel cell 10 comprises a cathode 11 and an anode 12, separated by an electrolyte 13. The oxygen O2, in known fashion, flows into the cathode 11, whilst the hydrogen $H_2$ flows into the anode 12. In the electrolyte 13 occurs the ionic migration of hydrogen ions $H^+$ with generation of electrons e– at the anode 12 and water $H_2O$ at the cathode 11.

FIGS. 3a and 3b shows a first embodiment of the storage tank according to the invention, in which a fuel cell 110 comprises an anode 112 made of hydride material absorbing 122 the hydrogen gas.

However, as shown in FIG. 3b which represents the absorbing hydride material 122 comprising grains of metal hydride 122' and gaseous hydrogen in the interstices 122'', by definition, a metal that generates hydride MH tends to transfer electrons to the hydrogen and hence it can be oxidised at least as much as hydrogen. Consequently, contact with the anodic environment must be avoided.

Figure 4:
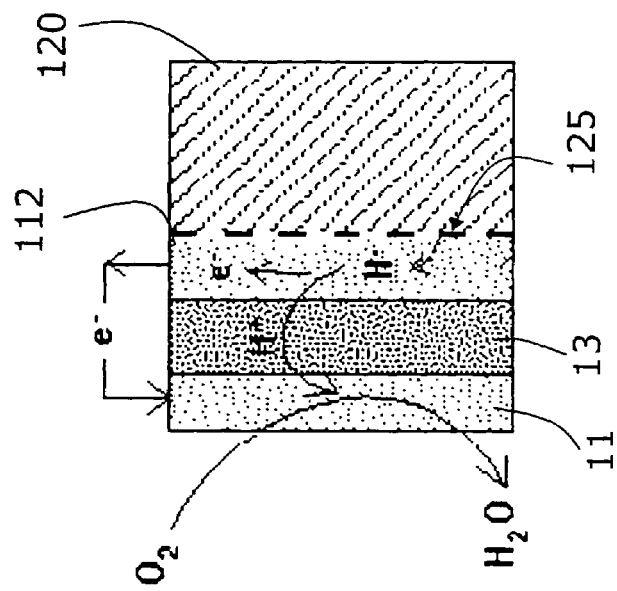
FIG. 4 is a schematic representation of a third embodiment of the system according to the invention.

FIG. 4 shows an embodiment in which the anode 112 and the tank 120 are contiguous, but separated by a wall 123. The hydrogen $H_2$ is provided to the anode 12 through an appropriate conduit 124.

Figure 5:
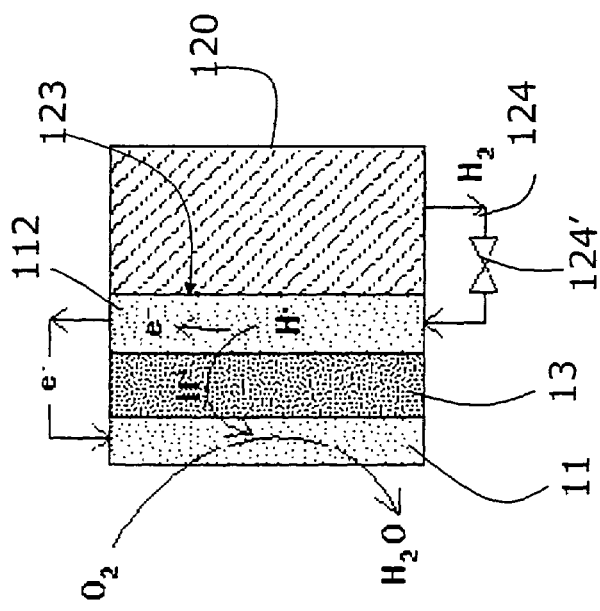
FIG. 5 is a schematic representation of a third embodiment of the system according to the invention.

FIG. 5 shows a second embodiment, which prevents only electrical contact between the anode 12 and the tank 120 by means of a porous baffle 125. Unfortunately electrolytes at low and medium temperature are always based on a liquid constituent, which in Proton Exchange Membrane Fuel Cells (PEMFC) is constituted by water. Environments interfaced with a liquid rapidly reach saturation equilibrium, and humidity is a factor that would deteriorate the absorbing material.

Figure 6:
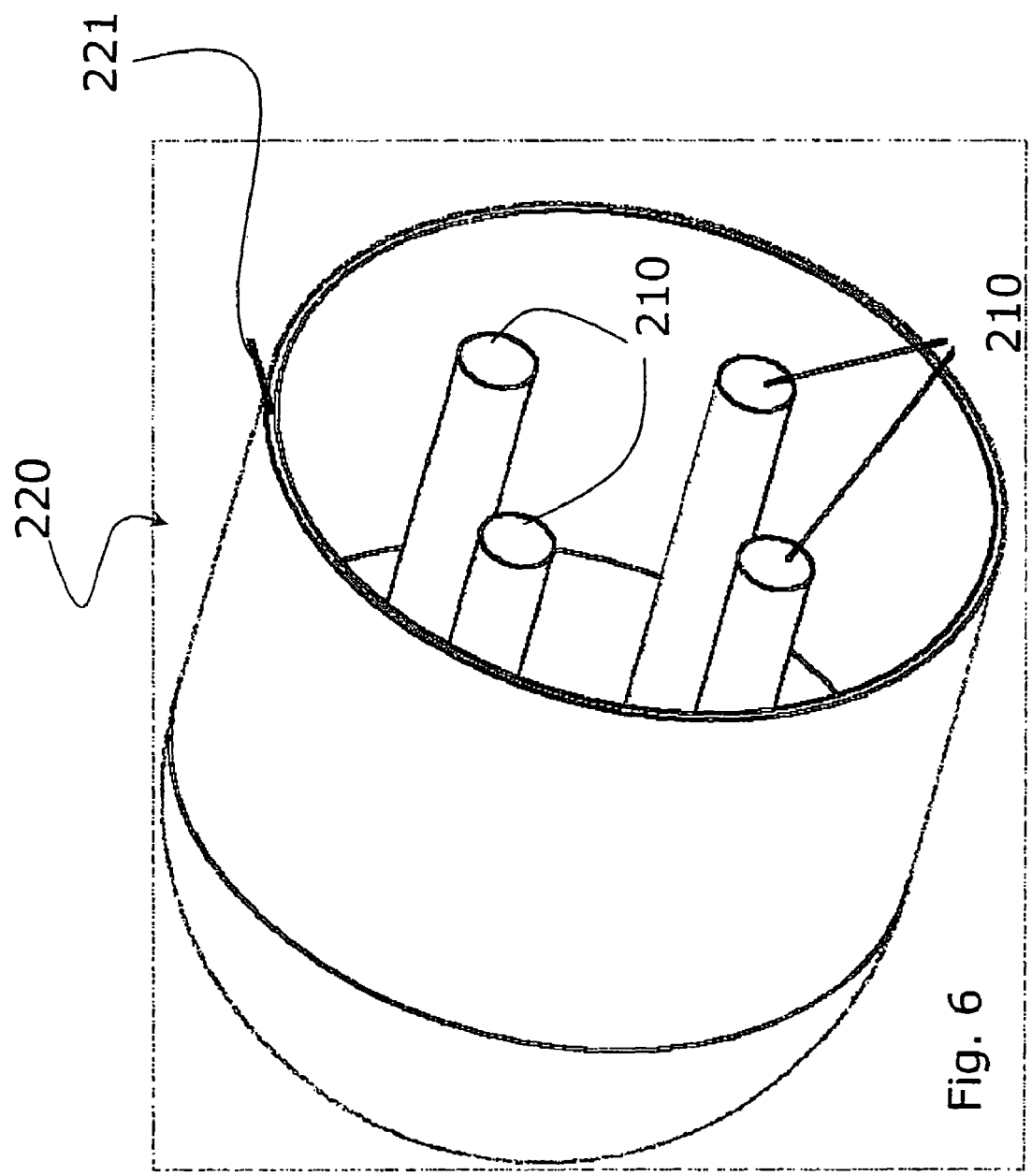
FIG. 6 is a schematic view of a preferred embodiment of the system according to the invention.

FIG. 6 shows the outline diagram of a preferred version of the feeding system for fuel cells according to the invention, in which is substantially provided a tank 220 which contains the fuel cells within it.

Said tank 220 is conceived in such a way as to separate the environments relating to the hydrogen absorbing material and to the anode, in such a way that they only exchange heat, confining humidity in the cell by means of a pressure difference between the tank and the cell, and with a geometry that facilitates the heat exchange.

Since the spaces are pressurised, a cylindrical/spherical geometry is adequate. To simplify the system, a cylindrical model is proposed.

As shown in FIG. 6, thus, said tank 220 comprises a cylindrical case 221, preferably made of R800 steel, in which are placed cylindrically shaped fuel cells 210. The space between the cylindrical case 221 and the fuel cells 210 is filled with hydride material 122, which therefore is in thermal contact with the fuel cells 210.

Figures 7A, 7B:
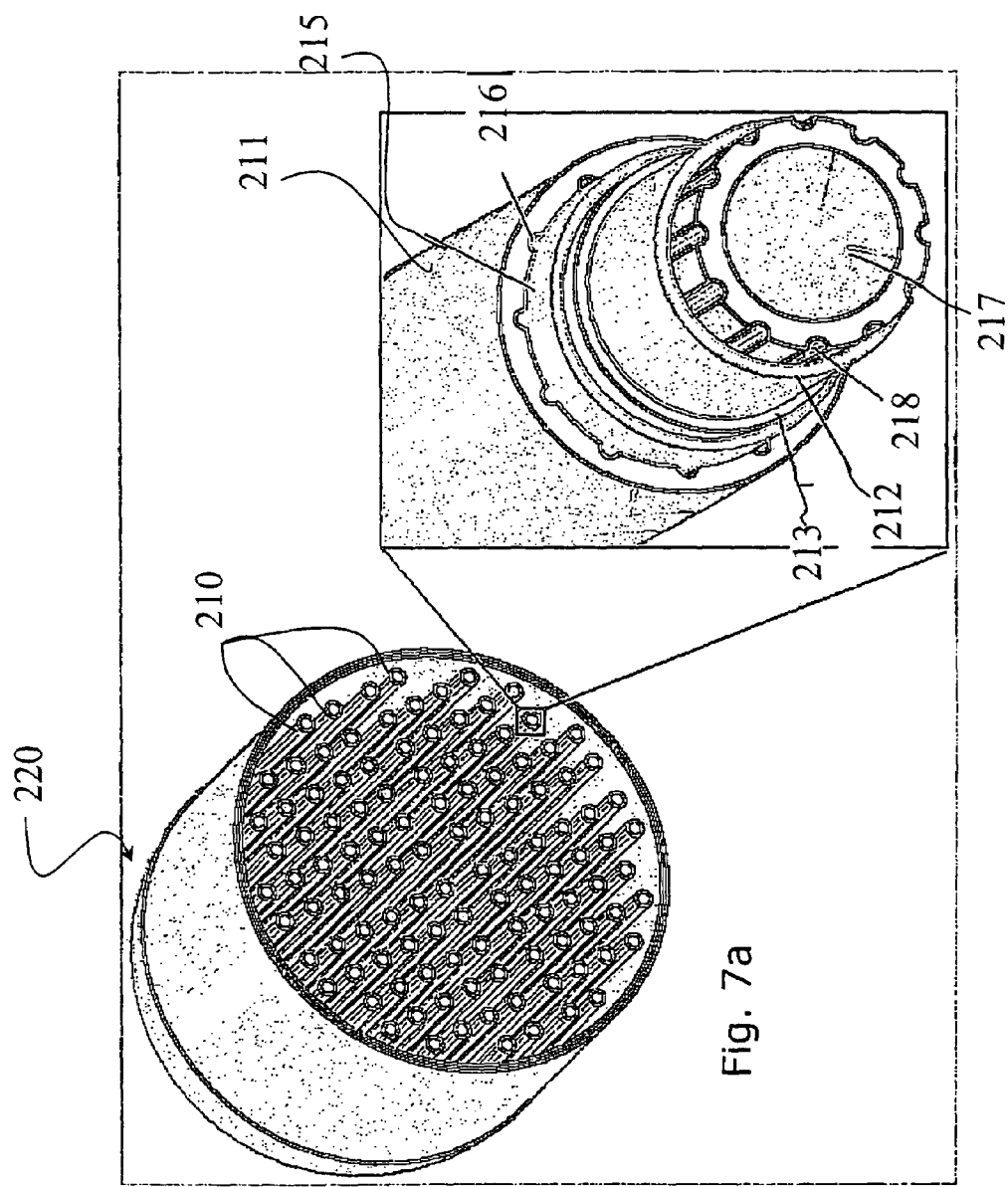
FIGS. 7a and 7b show details of the embodiment of FIG. 6.

FIG. 7 shows the tank 220 with cylindrical fuel tanks 210 with dimensions approaching the real ones. As shown in FIG. 7a, several tens of cylindrical fuel cells 210 are arranged with their main axes parallel to the main axis of the cylindrical case 221, constituting a cell bundle.

FIG. 7b shows a cell 210 in detail. It comprises, in a structure of coaxially positioned elements, a protective case 215, which contains a cylindrical cathode 211. Between the protective case 215 and the cylindrical cathode 211 are provided channels 216 for the oxygen. Inside the cylindrical cathode 211 is positioned a cylindrical electrolyte 213, which in turn contains a cylindrical anode 212. Said cylindrical anode 212 contains in its inside a conduit 217 for the passage of a diathermic fluid. On the outer surface of the conduit 217, in contact with the cylindrical anode 212 are provided with the channels 218 for hydrogen.

The cylindrical cell 210 shown in FIG. 7b is of the PEMFC type with absorbing material 122 in the tank of TiFe hydride.

In general, the proposed system the characteristics of the individual elements are mutually constrained. The choice of the absorbing material, for example, is constrained by the working temperature. The pressure provided by a hydride tank is a function of temperature, and therefore it is necessary to work at a temperature that guarantees, at least, the delivery of hydrogen at 1 bar. There are materials that deliver this pressure at ambient temperature, among which the best known is the aforementioned TiFe, which has a gravimetric content of about 2%.

To improve this aspect, therefore, it is possible to use as absorbing material magnesium, which can absorb 7.6% by weight of hydrogen in $MgH_2$. This material provides the equilibrium pressure of 1 bar at over 200° C.; therefore, a heat source at over 200° C. is necessary for desorption. Hence, we are outside the range of proton exchange membrane fuel cells. Cells that operate at this temperature must necessarily use a high boiling electrolyte, and "alkaline" (AFC) and "Phosphoric Acid" (PAFC) fuel cells have been obtained.

As a result of these considerations, models were developed based on two pairings:

PEMFC cells—TiFe hydride

AFC (or PAFC) cells—Mg hydride

Values relating to cells for two different types of applications are provided here:

automotive use—electrical power 20 kW;

micro-apparatus for electrical generation—electrical power 5 W

The electrical power that is exploited is a function of the active electrochemical surface area, which for 20 kW is about 6.6 $m^2$ for PEMFC cells in maximum efficiency conditions.

The volume of the tank was calculated as "petrol energy equivalent": in a model, a volume of magnesium equivalent to 50 l of petrol was considered, in the other one 25 l and in the "micro" model, 11.5 ml. Based on these data, the required number of cells is calculated, assuming that a cylindrical geometry in a diameter of 2 or 3 cm is obtainable, taking into account also the volumetric expansion from metal to hydride (19.3% in the AFC cell) and the weight of an external case with a maximum resistance of 30 bar.

The data obtained are shown in the following table:

|  | PEMFC cell for automotive use | AFC cell for automotive use | PEMFC microcell |
|---|---|---|---|
| Absorbent material | TiFe | Mg | TiFe |
| Working temperature | 60° C. | 200-250° C. | 60° C. |
| Dimensions (length × diameter) | 70 × 44 cm | 70 × 55 cm | 3 × 4 cm |
| Tank volume | 65 l | 110 | 28 ml |
| Equivalent petrol volume | 25 l | 50 l | 11.5 ml |
| Electrical power | 20 kW | 20 kW | 5 W |
| Active cell surface area | 6.6 $m^2$ | 5.9 $m^2$ | 20 $cm^2$ |
| Cell diameter | 2-3 cm | 2-3 cm | 2 cm |
| Number of cells | 160-100 | 150-90 | 1 |
| Weight of case (30 bar) | 4.9 Kg | 7.9 Kg | 0.6 g |
| Total weight | 390-440 Kg | 280-330 Kg | 170 g |
| Electrical power density | 0.19 $kW/dm^3$ | 0.11 $kW/dm^3$ | 0.13 $KW/dm^3$ |

The above table enables to evaluate the final characteristics of a system like the proposed one by simple energy and mass balances.

The thermal control of the system provides for the possibility of maintaining the working temperature solely with residual heat, which amounts to 10-20% of the enthalpy of combustion of hydrogen.

The solution described above allows to achieve considerable advantages with respect to known solutions.

The proposed system advantageously allows to recover the heat necessary to the desorption of hydrogen directly by the final user, i.e. the fuel cell. Feasibility is dictated by the numbers: the fuel cell has an electrical efficiency of about 50%, and hence it also produces 50% of heat. The enthalpy of desorption of hydrogen varies from hydride to hydride, but for materials of practical interest it can be evaluated between 30% and 40% of the enthalpy of combustion of hydrogen, hence such values fall within the available excess heat.

Therefore, with the described system hydrogen can be stored at a series of advantageous conditions:

high volumetric density low working pressures: savings in materials and technology, and safety of operation nearly nil energy cost, since excess energy is exploited.

Naturally, without altering the principle of the invention, the construction details and the embodiment may vary widely from what is described and illustrated purely by way of example herein, without thereby departing from the scope of the present invention.

For example, it is clear that even if the means for applying an amount of heat to the metal hydride that constitutes the material absorbing gaseous fuel are mainly obtained through the heat exchange between the anode and the metal hydride determined by the mutual arrangement of the tank and of the fuel cells, additional means for applying heat may also be provided in association with the tank.

The invention claimed is:

1. System for feeding gaseous fuel, in particular hydrogen, for fuel cells which comprises a storage tank for said gaseous fuel of the type comprising a case containing a material absorbing said gaseous fuel, in particular a metal hydride, and means for applying an amount of heat to said material absorbing gaseous fuel and for determining the flow of said gaseous fuel from said absorbing material towards an anode of one or more fuel cells, wherein said storage tank and said one or more fuel cells are mutually arranged in such a way as to achieve a heat exchange relationship between said anode of one or more fuel cells and said gas absorbing material, said means for applying an amount of heat comprising said heat exchange between said anode of one or more fuel cells and said gas absorbing material, and wherein said case of said storage tank contains at least in part said anode.

2. System as claimed in claim 1, wherein said anode comprises at least one wall in contact with said storage tank to achieve said heat exchange.

3. System as claimed in claim 2, wherein said wall comprises a porous baffle.

4. System as claimed in claim 1, wherein said case of said storage tank contains one or more fuel cells.

5. System as claimed in claim 4, wherein said one or more fuel cells comprise a cathode, containing a channel for the passage of a diathermic fluid, said cathode being contained within an electrolyte element, said electrolyte element being contained within said anode.

6. System as claimed in claim 5, wherein said case, said anode, said electrolyte element and said cathode have substantially hollow cylinder or tubular shape and are arranged coaxial to each other.

7. System as claimed in claim 1, wherein a pressure difference is applied between the storage tank and one or more fuel cells.

8. System as claimed in claim 2, wherein said system comprises a conduit for the flow of the gaseous fuel from the storage tank to the anode of the fuel cell.

9. System as claimed in claim 1, wherein said gaseous fuel is hydrogen.

10. System as claimed in claim 1, wherein said gas absorbing material is a metallic hydride, in particular Titanium Iron hydride or magnesium hydride.

11. System as claimed in claim 1, wherein said fuel cell is a Proton Exchange Membrane Fuel Cell or micro-cell and said gas absorbing material is titanium-iron hydride.

12. System as claimed in claim 1, wherein said fuel cell is an "alkaline" or "phosphoric acid" fuel cell and said gas absorbing material is magnesium hydride.

13. System for feeding gaseous fuel, in particular hydrogen, for fuel cells which comprises a storage tank for said gaseous fuel of the type comprising a case containing a material absorbing said gaseous fuel, in particular a metal hydride, and means for applying an amount of heat to said material absorbing gaseous fuel and for determining the flow of said gaseous fuel from said absorbing material towards an anode of one or more fuel cells, wherein said storage tank and said one or more fuel cells are mutually arranged in such a way as to achieve a heat exchange relationship between said anode of one or more fuel cells and said gas absorbing material, said means for applying an amount of heat comprising said heat exchange between said anode of one or more fuel cells and said gas absorbing material, wherein said anode comprises at least one wall in contact with said storage tank to achieve said heat exchange, and wherein said wall comprises a porous baffle.

14. System as claimed in claim 13, wherein said case of said storage tank contains at least in part said anode.

15. System as claimed in claim 14, wherein said case of said storage tank contains one or more fuel cells.

16. System as claimed in claim 13, wherein said system comprises a conduit for the flow of the gaseous fuel from the storage tank to the anode of the fuel cell.

* * * * *